United States Patent [19]

Botting

[11] Patent Number: 5,138,152

[45] Date of Patent: Aug. 11, 1992

[54] SIGNAL SENSING AND MEASURING IN FIBRE OPTIC SYSTEMS WITH LIGHT PULSE WIDTH DETECTING

[75] Inventor: Colin Botting, Whepstead, United Kingdom

[73] Assignee: Herga Electric Limited, Bury St. Edmunds, United Kingdom

[21] Appl. No.: 586,767

[22] Filed: Sep. 21, 1990

[30] Foreign Application Priority Data

Sep. 21, 1989 [GB] United Kingdom ............... 8921409

[51] Int. Cl.[5] ............................................. H01J 40/14
[52] U.S. Cl. ................................ 250/227.16; 250/231.1
[58] Field of Search .................. 250/227.16, 227.15, 250/227.21, 227.14, 227.24, 231.1

[56] References Cited

U.S. PATENT DOCUMENTS

| | | |
|---|---|---|
| 4,591,709 | 5/1986 | Koechner et al. |
| 4,678,903 | 7/1987 | Wlodarczyk et al. |
| 4,743,113 | 5/1988 | Jubinski ............................ 250/231.1 |
| 4,880,970 | 11/1989 | Jones ............................ 250/227.16 |
| 4,918,305 | 4/1990 | Wlodarczyk et al. ......... 250/227.14 |
| 4,947,037 | 8/1990 | Nash et al. ....................... 250/231.1 |

FOREIGN PATENT DOCUMENTS

| | | |
|---|---|---|
| 0033867 | 8/1981 | European Pat. Off. |
| 0131474 | 1/1985 | European Pat. Off. |
| 3211828 | 10/1983 | Fed. Rep. of Germany |
| WO8600988 | 2/1986 | PCT Int'l Appl. |

Primary Examiner—David C. Nelms
Assistant Examiner—Que T. Le
Attorney, Agent, or Firm—Richard M. Goldberg

[57] ABSTRACT

In a fibre optic sensor control system using an optical fibre (14) responsive to an applied external pressure P and through which a series of pulses are transmitted, a detector (20, 22) is responsive to the pulse-width of the received pulses rather than merely their amplitude. This results in less susceptibility to interference and also makes the system less sensitive to changes in the transfer characteristics of the electro-optical convertor (12) and/or of the opto-electrical convertor (20) and/or the maximum transmittance of the optical fibre.

24 Claims, 9 Drawing Sheets

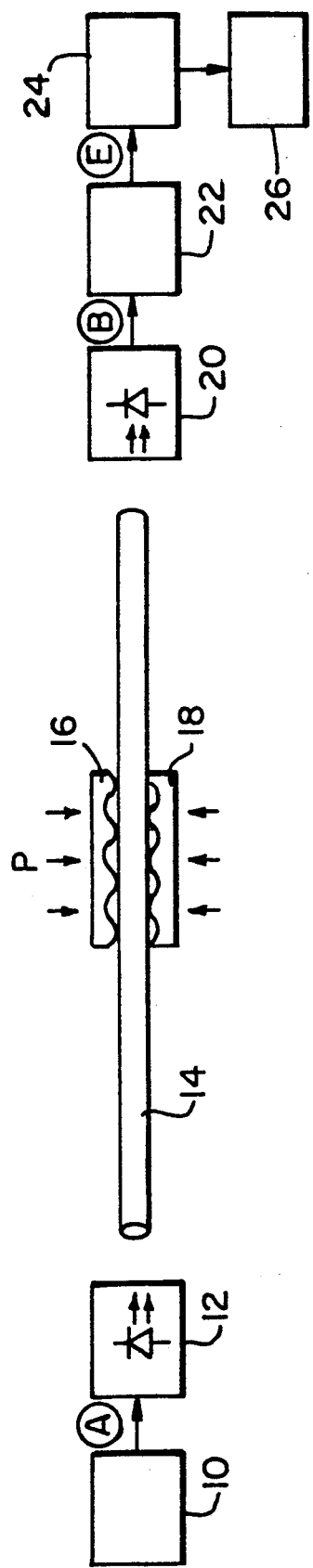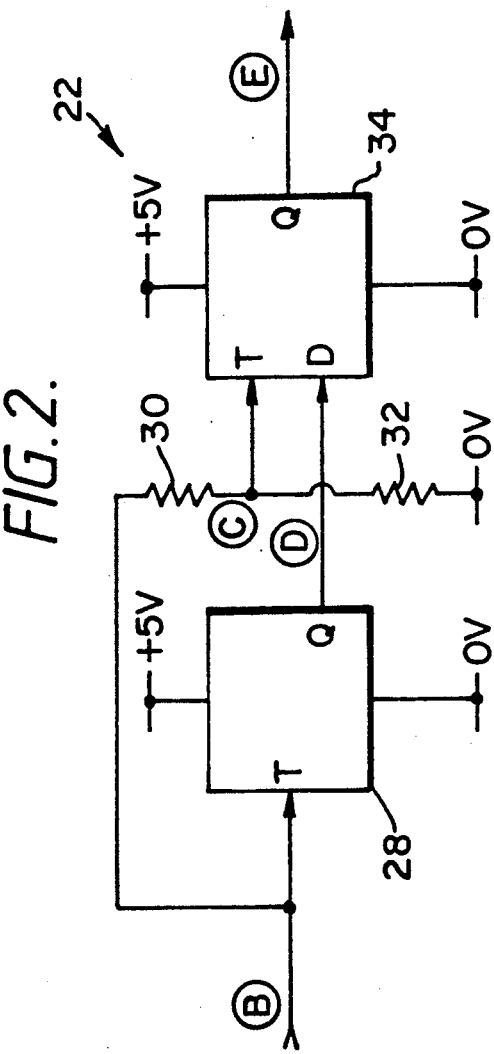
FIG.1.
FIG.2.

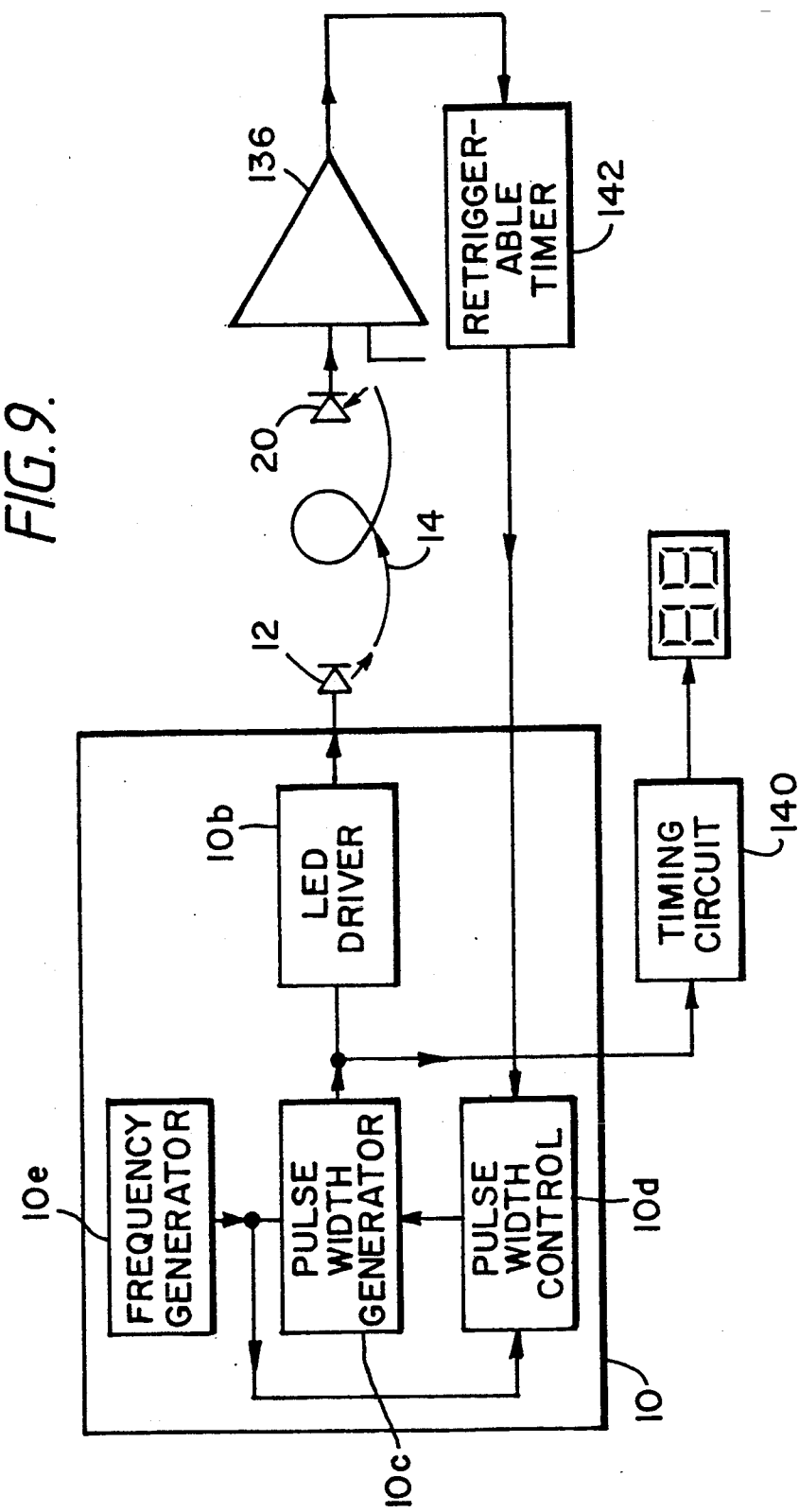

SIGNAL SENSING AND MEASURING IN FIBRE OPTIC SYSTEMS WITH LIGHT PULSE WIDTH DETECTING

FIELD OF THE INVENTION

This invention relates to signal sensing and measurement, particularly in control systems used with fibre optic sensors.

RELATED BACKGROUND ART

It is known to use an optical fibre sensor in a control system, for example a control system for an industrial machine, an automatic door, or an electrically powered vehicle window. The optical fibre is placed and arranged so that it is deformed using the phenomenon of microbending when an abnormal condition arises, such as a machine operator treading on a pressure mat incorporating the fibre placed in an exclusion zone around the machine, or a person's body being hit by an edge of an automatic door incorporating the fibre or being trapped between the edge of a vehicle window and the window frame. A series of optical pulses can be transmitted along the fibre from a source such as a light emitting diode to a sensor such as a photodiode, and the amplitude of the output of the sensor is processed and monitored. When an abnormal condition arises and microbending occurs, the transmittance of the fibre is reduced. This reduction in transmittance is detected and the control system responds by rendering safe the apparatus which it controls, for example by powering off the machine, door or window, or by opening the door or window. In the known arrangement the optical and electrical system can be designed to be "fail-to-safe", that is to say any fault which arises in the system should result in the apparatus which it controls being placed in the safe state. Optical fibre sensors are particularly advantageous in such a fail-to-safe system. One such system is described in European published application EP 031474A, assigned to the present assignees.

Referring to FIG. 10, the general arrangement of one such system is schematically illustrated; it comprises a control unit 1 connected via an electrical cable 2 to a transducer unit 3. The transducer unit 3 includes an optical emitter circuit 12 powered from a signal generator 10 in the control unit 1 via the cable 2, and an optical receiver 20 (e.g. a photo diode or photo transistor) generating an electrical signal for transmission through the cable 2 to a detector and control circuitry 22, 25 in the control unit 1. Coupling the emitter 12 and the receiver 20 is an optical fibre sensor 14. A device 26 is controlled by the control circuitry 24, in dependence upon a sensed condition.

In some industrial applications, the cable 2 can be up to 50 meters long. In environments with high levels of ambient electromagnetic or radio frequency interference pollution (such as factories or other industrial environments, or automobiles) major problems arise in this known system. The interference has a negligable effect on the emitter circuit 12, which can be pulsed with currents of 1 amp or more to drive an LED, but the detector circuit 20 may have a working current of micro amps and is very much more susceptible to interference.

We have found that in such high levels of interference, the control unit 1 can therefore respond to interference spikes or pulses induced in the cable 2 as if they were pulses produced by the receiver 20 in response to optical pulses. This is a dangerous condition, in that even if the abnormal condition has reduced the transmittance of the fibre 14 to a level where no optical pulses are detected by the receiver 20, the control unit 1 can continue to respond to spurious pulses and hence fail to sense the abnormal condition.

One approach to the problem is to fail-to-safe by switching out the control circuit all together at a level where it cannot discriminate between the interference and the genuine signal. Whilst this is safe, it is undesirable since the circuit no longer operates, which in an industrial environment can mean down time on high volume production lines.

The electrical and optical pulses in the known system are conveniently substantially rectangular wave pulses of finite amplitude and period, and the interference appears as high amplitude spikes of very short period. It has been considered to use conventional passive or active filters in the electrical system to remove the interference, but such filters would also remove the high frequency harmonics making up the substantially rectangular wave pulses and cause distortion and damping of the proper pulses. Another problem with such an approach is that it is well known that improving the characteristic of the filter involves adding further components or orders. However, fail-to-safe systems must satisfy requirements as to the failure of components such that components cannot fail (either by short-or open-circuit) in a manner which leads to unsafe operation. Adding further components therefore reduces the intrinsic failure-safety of the apparatus, so that good filter performance and intrinsic reliability are opposing requirements.

It has also been considered to use phase locking of the electrical signal sensed by the receiver 20 with the originating electrical signal powering the emitter 12, that is to say comparing the two signals so that the proper pulses and the interference spikes can be distinguished. However, this method of verifying the sensed signal is not acceptable in a fail-to-safe system, because under certain fault conditions in the comparison circuitry the originating electrical signal could be passed to the control unit 1 so that the system would not be fail-to-safe.

SUMMARY OF THE INVENTION

A solution to the above problem is provided by one aspect of the invention, in that, broadly speaking, the detection circuitry is responsive to the pulse width of the sensed signal at a predetermined voltage threshold and therefore can distinguish between the proper pulses and the interference spikes and filter out the interference spikes. It has also been found by testing that by monitoring the pulse width (at a predetermined threshold) rather than simply the amplitude of the signals, the sensitivity in detecting pulse presence of the system can be increased compared with a system which detects the amplitude of the sensed voltage. This is due in part to the fact that, in such systems, the electro-optical response of the light source and the opto-electrical response of the light detector vary with certain parameters, especially ambient temperature, in a non-cancelling manner so that the voltage to be detected varies with these parameters. In the known system, the threshold voltage used in the detector must be set so that the system will operate under all conditions and therefore although a best setting can be adopted for one condition, it will not be the best setting for other conditions.

However, pulse width is affected substantially less than simply pulse amplitude, and thus a more sensitive system can be provided. Furthermore, the known system suffers from the disadvantage that the response characteristics of the light source and light detectors can be different for different devices, and the maximum transmittance of the optical fibre can differ, and therefore to obtain a best setting, the threshold value must be adjusted for each individual apparatus which is built to take account of the particular responses of the components which are used. However, by detecting a parameter, such as pulse width, which is not substantially affected by the characteristics of the components employed, such adjustment becomes much less necessary.

In a different aspect, the invention provides, broadly speaking, a signal measuring technique and apparatus in which the pulse width is used to derive a measured parameter. It was found that the pulse width can be varied directly with the level of transmittance of light in the fibre which in turn is varied by the bending or microbending of the fibre. It is noted that the width of the base of the pulse is constant and the pulse width which varies is at a selected voltage threshold. As the width varies, the pulse changes from a substantially rectangular shape towards a more triangular shape.

In a first technique, the received pulse width may be measured directly and a signal parameter derived from it. In a second technique, a pulse width dependent signal derived at the receiver 20 is employed to control the width of the optical pulse generated by the emitter 12, so as to maintain the received pulse width constant. The signal parameter is then derived from, or related to, the width (or a related parameter) of the transmitted pulse.

BRIEF DESCRIPTION OF THE DRAWINGS

FIG. 1 is a schematic block diagram of a "fail-to-safe control" system;

FIG. 2 is a circuit diagram of a detector used in the system of FIG. 1;

FIG. 8b illustrates wave forms arising in the circuit of FIG. 8a;

FIG. 9 shows a fifth embodiment of the invention; and

DETAILED DESCRIPTION OF THE PREFERRED EMBODIMENTS

Figure 3:
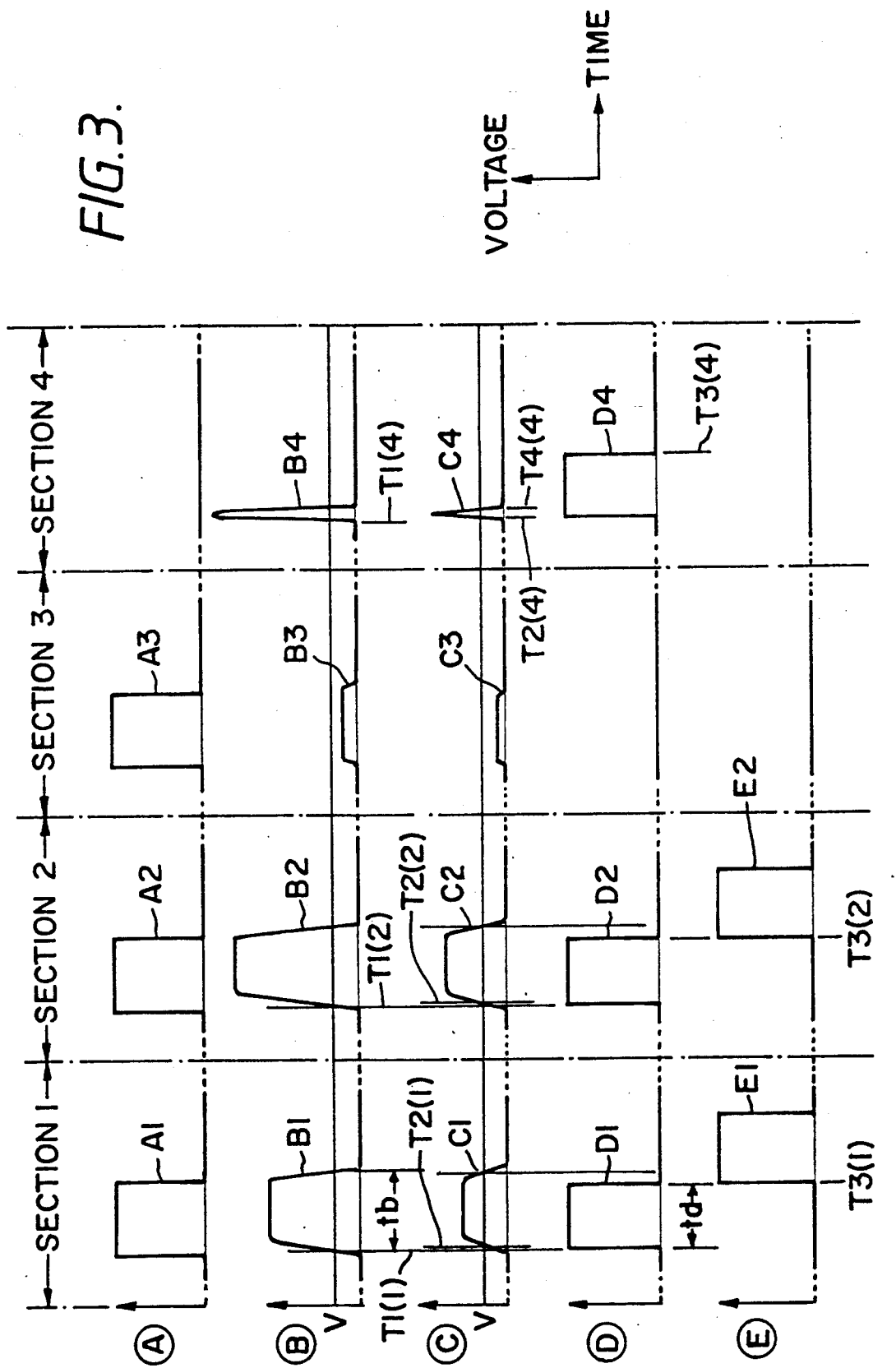
FIG. 3 illustrates wave forms arising in the system.

Referring to FIG. 1 in a first embodiment, a signal generator 10 produces a predetermined rectangular wave electrical signal A having a period of about 0.5 ms and a pulse width of about 0.015 ms which is supplied to an electro-optical convertor 12, such as a light emitting diode. The resulting optical signal is supplied to one end of an optical fibre 14 which forms part of a pressure mat or a "safe-edge" or any other pressure sensing device and which can be caused to microbend when an external pressure P is applied for example through the agency of a pair of serrated elements 16, 18. Thus, the optical signal is transmitted to the other end of the optical fibre 14 when external pressure P is small, but is substantially attenuated or blocked when pressure P is large. This optical signal is supplied to an opto-electrical convertor 20, such as a photo-diode or photo-transistor, and a resulting amplified electrical signal B is fed to a filter circuit 22, described in detail below.

The opto-electrical convertor 20 may in particular be the K-7350 T-1 plastic silicon photo-diode manufactured by Optek Technology Inc., 345 Industrial Boulevard, McKinney, Tex. 75069, USA or the L2813/01 or L2823/01 PIN diode high speed receiver unit SMA style manufactured by Belling Lee Intec Limited, Intec House, 540 Great Cambridge Road, Enfield, EN1 3QW, UK. The behaviour of these devices is discussed in greater detail below.

The filtered signal E is fed to a processing circuit 24, which is operable to determine whether or not the signal E is a predetermined pulse signal (which corresponds to the predetermined signal A). If it is not, then the processing circuit renders safe an apparatus 26 which is controlled by the system, such as an industrial machine, automatic door, or electrically powered window.

The filter circuit 22 is shown in more detail in FIG. 2. The term "filter circuit" is here used as a loosely descriptive term, since although noise spikes are "filtered" or rejected, no actual frequency-domain filtering occurs. The input signal B is applied to the trigger input T of a first TTL timer 28, and is also applied via a divider comprising a pair of attenuating resistors 30, 32 as a signal C to the trigger input T of a second TTL timer 34. An output signal D of the first timer 28 goes high for about 0.01 to 0.035 ms when the input signal B rises above a threshold and is fed to a disable input of the second timer 34. An output signal E of the second timer 34 forms the output of the filter circuit 22 and goes high for about 0.015 ms after both the disable input D is low and the voltage C on the trigger input T is above a threshold voltage V. The resistors 30, 32 serve to attenuate the the trigger voltage C to the second timer 34 by a factor of about one half by comparison with the input signal B for a reason described below. The first and second timers 28, 34 may be implemented using 74LS221 devices.

The response of the system of this embodiment will now be described with reference to FIG. 3, which is divided into four sections to illustrate the responses:

1. to a normal pulse when no pressure P is applied.
2. to a normal pulse when no pressure P is applied and when the responses of the converters 12, 20 are different.
3. to a normal pulse when a substantial pressure P is applied; and
4. to an interference spike; respectively.

Referring to section 1 of FIG. 3, the optical pulse produced by a source electrical pulse A1 is transmitted through the optical fibre and produces at the detector a corresponding electrical pulse B1, with slightly more ramped rising and falling edges, exaggerated in FIG. 3 for the purpose of clarity. The pulse B1 rises through the threshold voltage V of the first timer 28 at time T(1) and causes a pulse D1 to commence at that time. The pulse B1 is also attenuated by the resistors 30,32 to produce a smaller pulse C1, which rises through the threshold voltage V of the second timer 34 at a slight later time T2(1). By this time, the second timer 34 has been disabled by the pulse D1. The pulse width td of the pulse D1 is set to be slightly shorter than the pulse width tb of normal received pulses, and therefore when the pulse D1 ceases to disable the second timer 34 at time T3(1) the pulse Cl is still above the threshold voltage V, and accordingly the second timer 34 commences to produce an output pulse El at that time.

If the convertors 12, 20 have a different transfer characteristic, or the optical fibre 14 has a different maximum transmittance, then the pulses B and C may have different pulse heights, as shown by pulses B2, C2 in section 2 of FIG. 3, and it will be appreciated that this has a very small effect on the timings T1 and T2, but otherwise the system reacts in a similar fashion to that shown in section 1 of FIG. 3.

As shown in section 3 of FIG. 3, when a substantial external pressure is applied to the optical fibre, the transmittance of the fibre is severely attenuated or nullified, and the pulses B3, C3 do not exceed the threshold voltages V of the timers 28, 34. Accordingly, no output pulse E is produced.

As described above, the transition between an output pulse E being produced and not being produced occurs when the level of the pulse C fails to exceed the threshold value. However, the circuit can be made more sensitive by adjusting the period td of the pulses D produced by the first timer so that they are only slightly shorter than the width of the input pulse. Due to the ramped nature of the leading and trailing edges of the pulses C, the pulse width of the pulses C become less, when measured at the threshold voltage, as the pulses are reduced in amplitude. Thus, the pulse width D can be chosen so that the pulse D terminates before a pulse C of large amplitude (which thus generates an output signal E), but so that the pulse D terminates after a pulse C of smaller amplitude still in excess of the threshold voltage (which thus does not generate an output signal).

If interference arises in the system, it is likely to be represented at the input to the detector as a high amplitude spike of very short duration, as shown by pulse B4 in section 4 of FIG. 3. This pulse exceeds the threshold voltage V of the first timer 28 at time T1(4), and thus pulse D4 commences to disable the second timer 34. The attenuated pulse C4 exceeds the threshold V of the second timer 34 at time T2(4), but because of the short duration of the pulse it falls below the threshold voltage V shortly thereafter at time T4(4). Therefore, the second timer 34 is not triggered, and no output pulse E is produced.

From the foregoing, it will be clear that the system of the first embodiment exhibits several characteristics. Firstly, it does not respond at all to pulses having a width less than a predetermined duration, whatever their magnitude. Thus, it does not respond at all to noise pulses. This "filtering" aspect of the system is due mainly to timer 28, which could be used on its own, with the second timer 34 being replaced by a sample and comparison circuit for measuring the pulse amplitude, or any other known pulse measuring technique.

Secondly, the system is responsive to pulses of at least a predetermined width and at least a predetermined magnitude, or specifically pulses of a predetermined width at a predetermined magnitude. While pulses continue to exceed both the width and magnitude required, the system produces outputs and thus acts as a detector. Because the electrical pulses received at the "filter" circuit 22 are significantly non-rectangular, the apparatus can be arranged to respond to very small changes of signal level because such changes of level produce corresponding changes in width, which can sensitively be measured using timing circuitry.

It will be appreciated that if the pulses at the input to the filter circuit were in fact rectangular, the pulse width at the predetermined threshold would be constant until the pulse fell below the predetermined threshold, at which point the pulse width would become zero; the use of non-rectangular pulses thus surprisingly increases the sensitivity of the system rather than degrading its performance. Whether the non-rectangularity of the received pulses is due to the emitter 12, the fibre 14, or the receiver 20 is of no great importance in this embodiment.

It will be appreciated that the invention may be implemented in other ways in order that the detector is responsive to the pulse-width of the received pulses rather than merely the amplitudes of the received pulses.

A second embodiment of the detector circuit will now be described with reference to FIGS. 4 and 5. The circuit of FIG. 4 employs a pair of circuits like those in FIG. 2, and a verification circuit.

Figure 4:
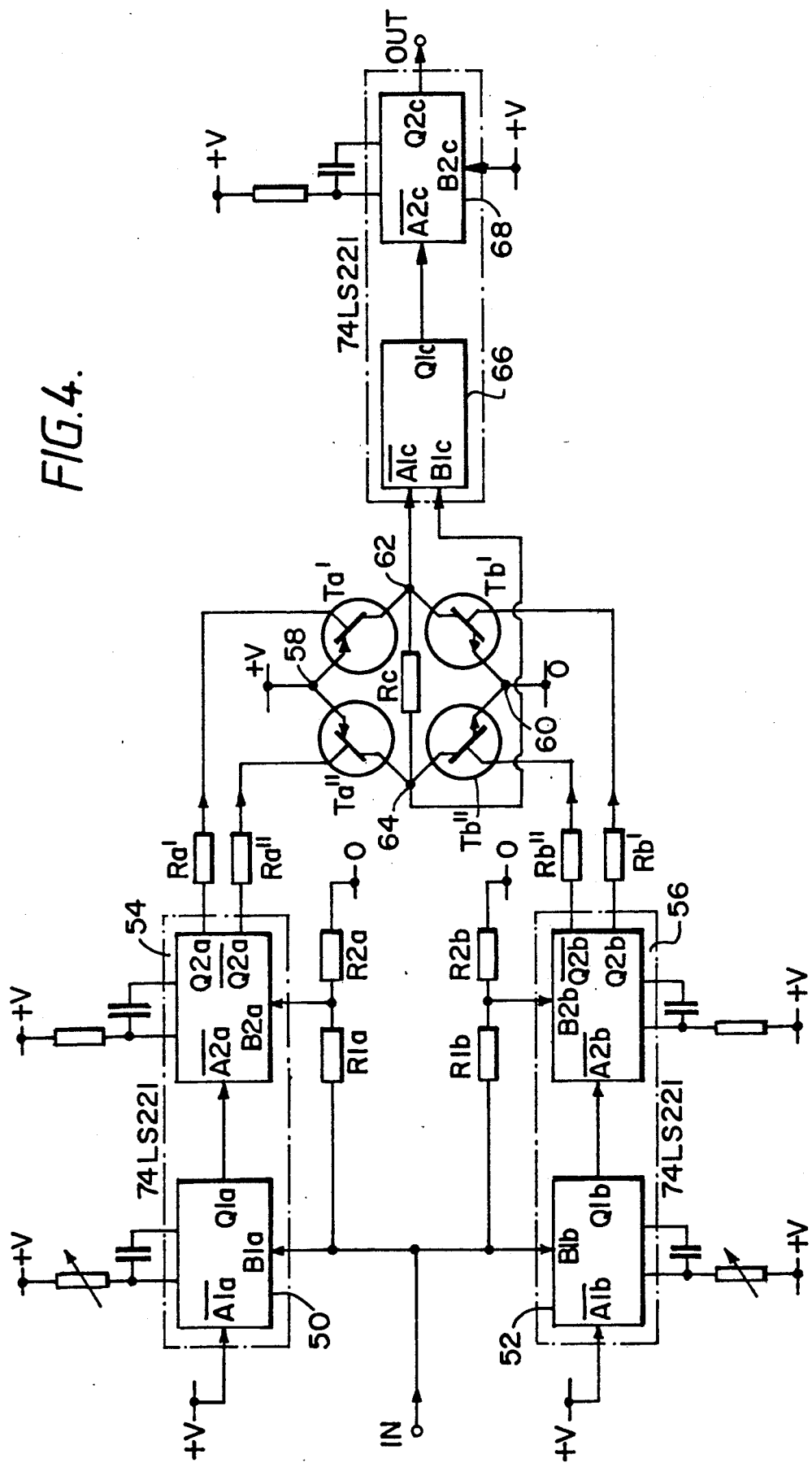
FIG. 4 is a circuit diagram of a modified detector.

In FIG. 4, an input signal IN is fed to: (a) the inputs B1a, B1b, of two monostable flip-flops arranged as timers 50, 52, (b) via attenuating resistors R1a, R2a, to the input B2a of a further timer 54; and (c) via attenuating resistors R1b, R2b to the input B2b of another timer 56. The outputs Q1b of the timers 50, 52 feed the disable inputs A2a and A2b of the timers 54, 56, respectively. Each timer 50–56 has a resistor and capacitor to set the period thereof, and in the case of timers 50, 52, the resistors are variable. Thus, the circuit is like two of the FIG. 2 circuits.

The timers 54, 56 have outputs Q2a, Q2b respectively, each with a complementary output $\overline{Q2a}$, $\overline{Q2b}$, and these four outputs are fed via resistors Ra', Rb', Ra", Rb", to the bases of four transistors Ta', Tb', Ta", Tb", arranged as a bridge with (a) the junction 58 between the emitters of PNP transistors Ta', Ta" connected to the positive supply rail; (b) the junction 60 between the emitters of NPN transistors Tb', Tb", connected to the ground rail; and (c) the junction 62 between the collectors of transistors Ta', Tb' connected via a resistor Rc to the junction 64 between the collectors of transistors Ta", Tb". The junctions 62, 64 are also connected to the set and reset inputs A1c, B1c of a further monostable flip-flop arranged as an R-S (Reset/Set) latch. The output Q1c of the R-S latch feeds the input of another monostable flip-flop arranged as a timer 68 and having a capacitor and resistor setting its period. The output Q2c of the timer 68 provides the output OUT of the detector circuit. In FIG. 4, dual monostable flip-flop devices 74LS221 provide: (a) the timers 50, 54; (b) the timers 52, 56; and (c) the R-S latch 66 and the timer 68.

Figure 5:
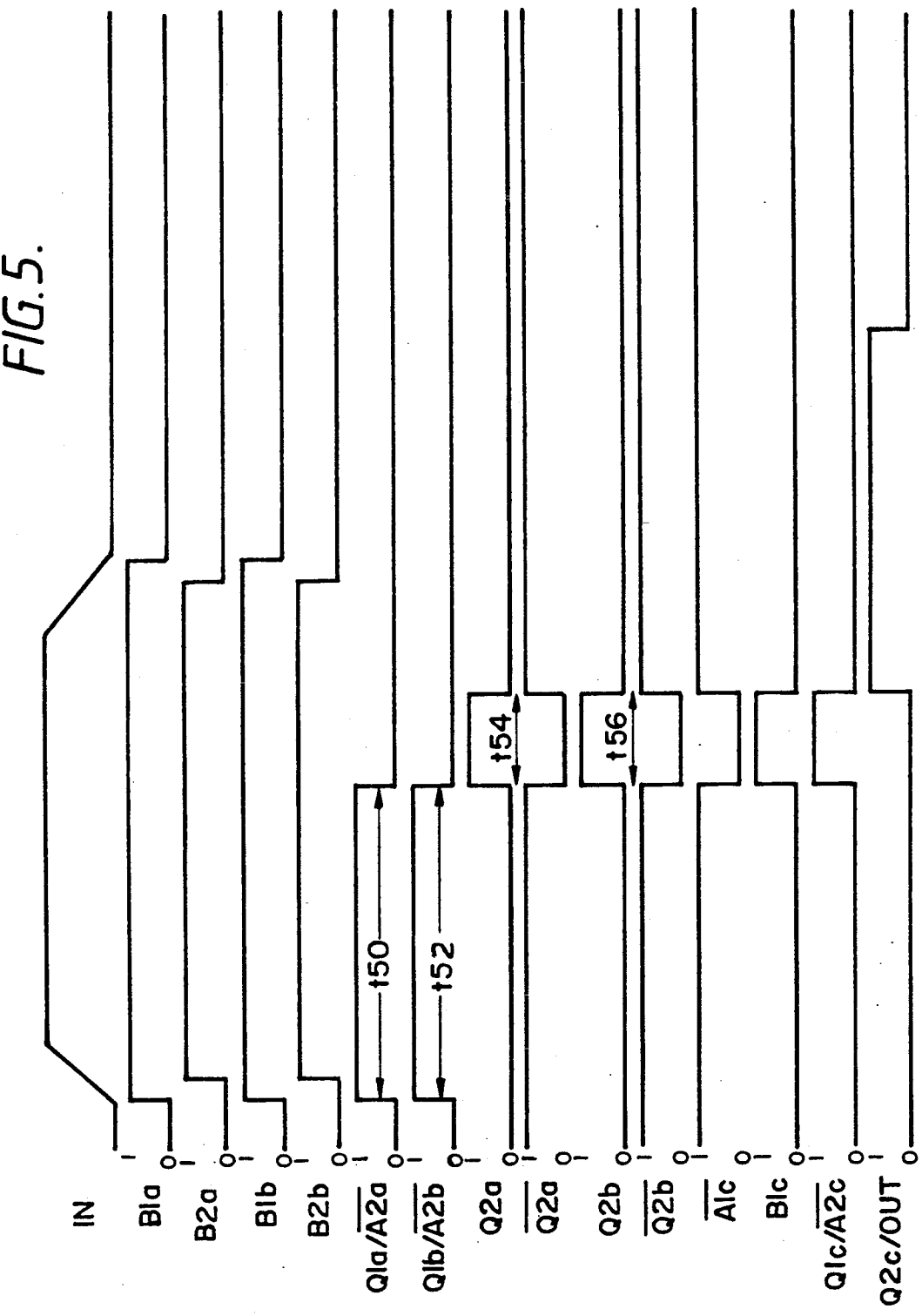
FIG. 5 illustrates waveforms arising in the circuit of FIG. 4.

The waveforms arising in the circuit of FIG. 4 during normal operation without a pressure P applied to the optical fibre are shown in FIG. 5. For simplicity in FIG. 5, the signals (except the input signal IN) are shown as logical "1" or "0" depending upon whether they are above or below the TTL threshold level. In FIG. 5, it can be seen that the signals B1a and B1b are like signal B in FIG. 3; the signals B2a and B2b are like signal C in FIG. 3; the signals Q1a/A2a and Q1b/A2b are like signal D in FIG. 3; and the signals Q2a and Q2b are like signal E in FIG. 3.

Normally, the state of transistor bridge is as shown by column A in the following Table 1:

TABLE 1

|  | A | B | C | D |
|---|---|---|---|---|
| Q2a | "0" | "1" | "0" | "1" |
| Ta' | ON | OFF | ON | OFF |
| Q2b | "0" | "1" | "1" | "0" |
| Tb' | OFF | ON | ON | OFF |
| A1c | "1" | "0" | "1"* | "1"+ |
| Q2a | "1" | "0" | "1" | "0" |
| Ta" | OFF | ON | OFF | ON |
| Q2b | "1" | "0" | "0" | "1" |
| Tb" | ON | OFF | OFF | ON |
| B1c | "0" | "1" | "1"+ | "1"* |
| Q1c | "0" | "1" | "0" | "0" |

The signals A1c="1" and B1c "0" result in the output Q1c of the R-S latch being "0". In response to a proper input pulse IN, when the timers 54, 56 are simultaneously timing out, the state of the bridge is as shown in column B in Table 1. The signals A1c="0" and B1c="1" result in the output Q1c of the R-S latch 66 being "1". This does not trigger the timer 68. However, when the bridge reverts to the state of column A, the falling edge of signal Q1c triggers the timer 68, which produces an output pulse Q2c for a predetermined period.

If the timer 56 commences timing out before timer 54, then the bridge takes the state of column C in Table 1. As marked by an asterisk, the signal A1c is at an intermediate state, but this is higher than the TTL threshold and therefore is logic "1". Furthermore as marked by a plus sign, the signal B1c is allowed to float by the transistors Ta", Tb", but is pulled up to logic "1" by resistor Rc. A symmetrical effect arises if timer 54 commences timing out before timer 56, as shown by column D in Table 1. In either case, the output Q1c of the R-S latch remains at logic "0". If one of the timers 54, 56 finishes timing out before the other commences timing out, or if the other timer fails to operate at all, then the bridge reverts to the state of column A, and no pulse Q1c is output from the R-S latch. For example the following sequences of states will not produce an output pulse Q1c:

A-C-A

A-C-A

A-C-A-D-A

A-D-A-C-A

However, if the timing out of the timers 54, 56 overlaps, then a pulse Q1c will be output from the R-S latch. For example, the following sequences of states will produce an output pulse Q1c:

AB-A

A-C-B-D-A

A-D-B-C-A

It will therefore be appreciated that the transistor bridge and R-S latch act to verify that the two filter timer circuits 50, 54; 52, 56 are reacting in a generally similar manner. In order to improve the sensitivity of this verification operation, the periods of the timers 54, 56 indicated as t54, t56 in FIG. 5, are preferably set to be substantially shorter than the periods t50, t52 of the timers 50, 52. To prevent any failures due to external or internal short circuits across the latch 66 or timer 68, they should be constructed on separate integrated circuits.

In the preceding embodiments, it was demonstrated that where non-rectangular pulses form the input to the filter circuit 22, the pulse width detection process is more sensitive. This principle can also be used to produce a quantitative measurement of the level of the attenuation in the fibre, and hence of the external influence acting upon the fibre.

Figure 6:
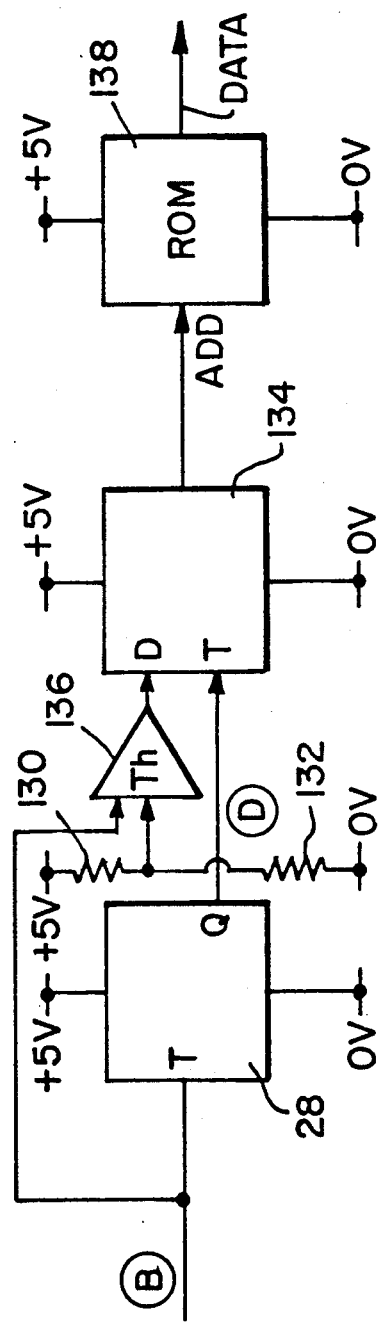
FIG. 6 shows a third embodiment of the invention.

One simple way of implementing such a system is illustrated with reference to FIG. 6, in which the circuit of FIG. 2 is adapted as follows. The second timer 34 is replaced by a digital counter circuit 134, which is triggered by a falling edge on the signal D from the output of the first timer 28, and disabled by a falling edge from the output of a comparator 136 receiving as inputs the signal B from the detector and a reference potential obtained through a divider chain 130, 132. The counter 134 may be arranged to commence counting at value corresponding to the length of the period of the first timer 28, so that if, after the period of timer 28 has expired, the signal level remains above the threshold level of the comparator 136, the counter 134 counts the length of time for which the signal remains above the threshold and, once it is disabled, the contents of the counter register of the counter 134 give a measure of the signal pulse width at the predetermined threshold. This can be decoded and displayed on, for example, a standard seven segment display device, or processed in any suitable fashion by for example, a microprocessor or micro-controller device; in particular, since the relationship between pulse width and the parameter to be measured is not usually linear, the timer output may be connected to the address lines of a ROM 138 configured as a look up table for converting timer values to parameter values at its data outputs.

Where immunity against noise spikes is not vital, the first timer 28 may be omitted and the counter 134 may be triggered by a rising edge on the output of the comparator 136. Its output will therefore give a direct measurement of the width of the pulse.

Whether the invention is employed to merely indicate the presence or absence of an external condition or to provide quantitative measurements of its value, in a fourth embodiment of the invention, means are provided for controlling the optical signal produced by the emitter 12 to maximise the sensitivity of the system.

Figure 7A:
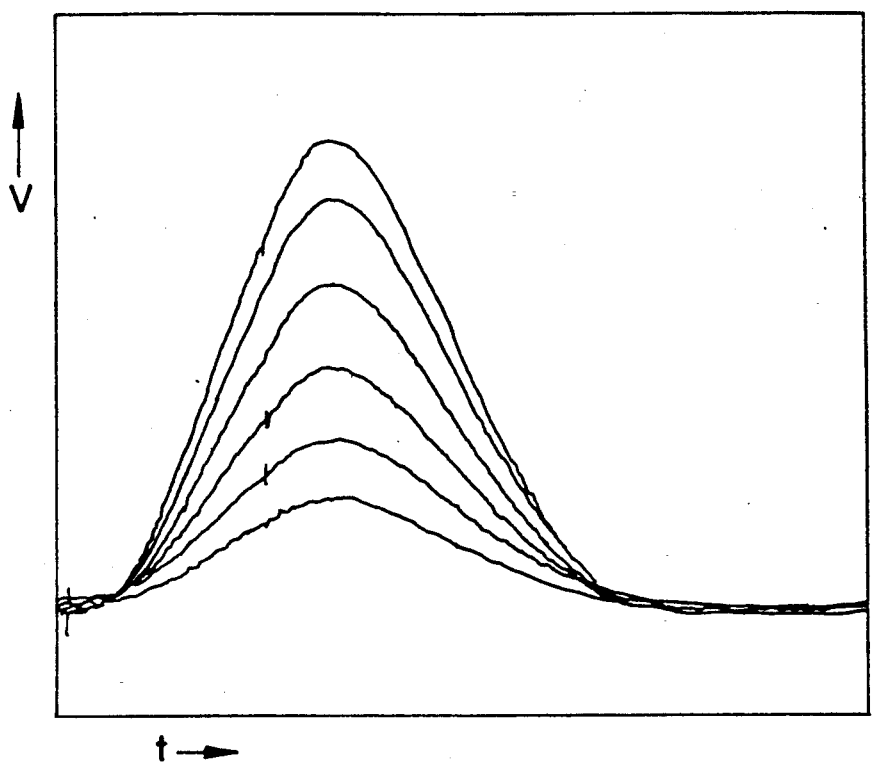
FIGS. 7a to 7c show response characteristics of detectors used in the illustrated embodiments.

Referring to FIG. 7a, when the K-7350 device is used as the receiver 20, it is found that the pulses generated in response to optical pulses produced at the emitter 12 are strongly non-linear. The pulse width is approximately constant at the base, or dark current, level for all amplitudes of received signal, but when any given reference level is considered, the pulse width at that level depends upon the amplitude of the received pulse. The curves in FIG. 7a show the response at the output of the receiver 20, which also included an amplifier stage to boost the levels of the signals produced by the receiver 20. Since the fibre 14 and associated couplers at the emitter 12 and receiver 20 can cause heavy optical attenuation, the light levels on the receiver 20 may be as low as pico Watts. The response of the detector 20 is generally fairly linear between 20 to 80% of its output range, but is less linear above and below this. The following amplifier stage within the receiver 20 which gave rise to the curves of FIG. 7a was a single rail 2904 amplifier device, and it is found that the slew rate of this amplifier was sufficiently low to give generally triangular output pulses from the receiver 20.

Figure 7B:
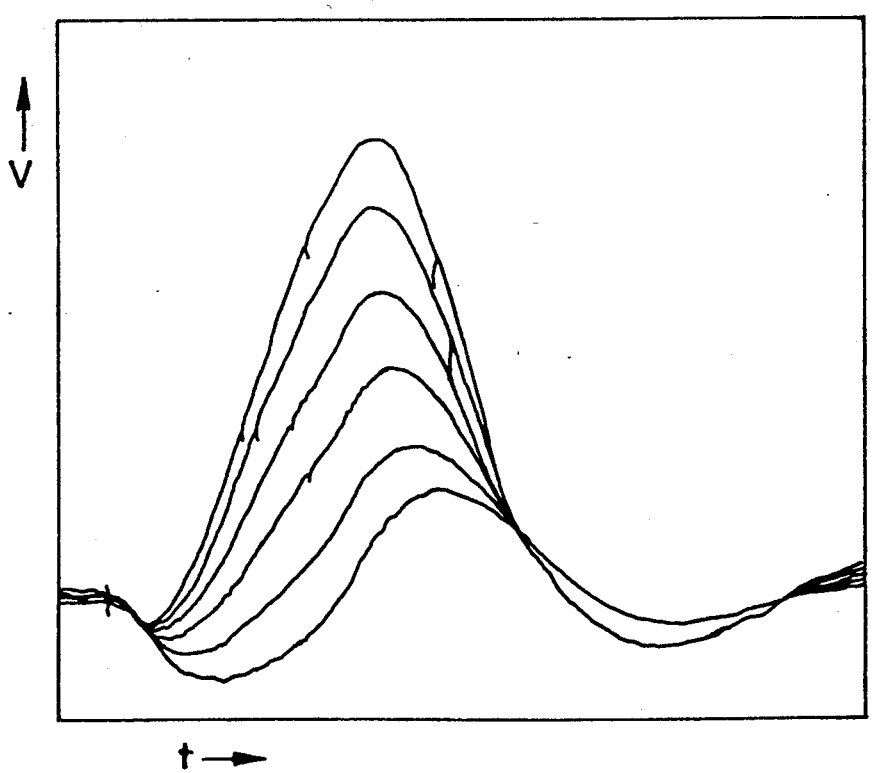
Figure 7C:
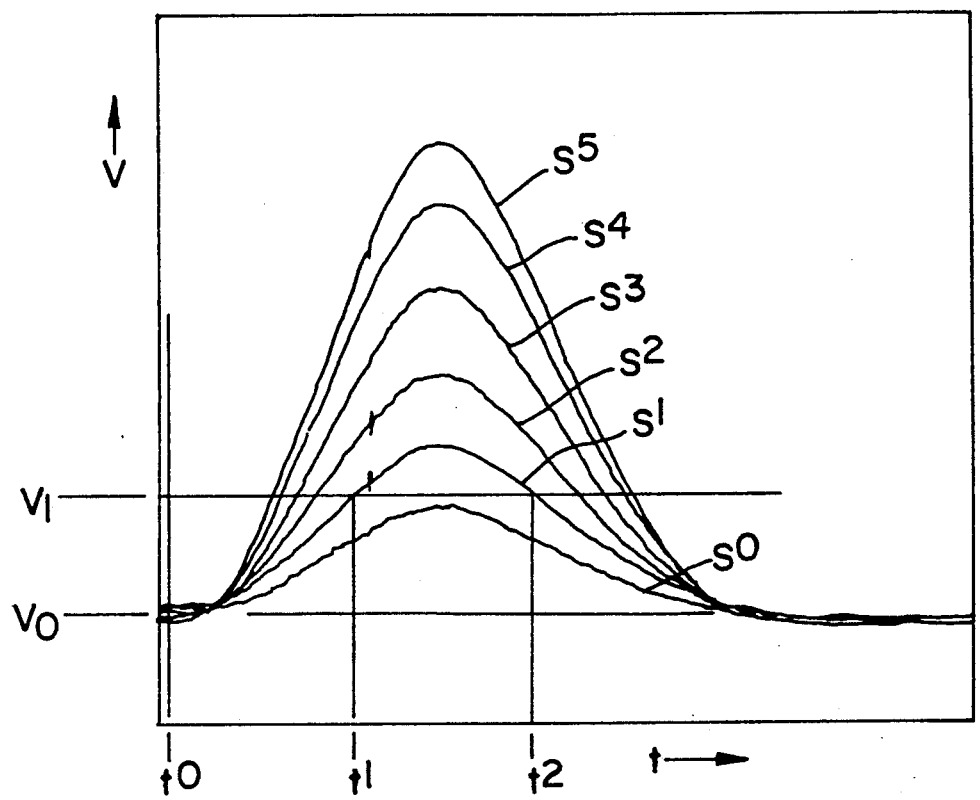

Referring to FIG. 7b, the corresponding shapes of electrical pulses generated by the L2813 device followed by a bifet TL072 two stage amplifier device in response to received optical pulses of various magnitudes are shown. The offset appearance of the pulses in FIG. 7b is due to the device being driven into saturation by the relatively high output of the emitter 12. The slew rate of the bifet amplifier device is faster than that of the 2904 device, and the non-linearity of the curve is in this embodiment partly due to the non-linearity of the detector 20 driven into saturation, and partly due to the non-rectangular nature of the pulses produced by the emitter 12, discussed in greater detail below. Referring to FIG. 7c, which corresponds to FIG. 7a, $V_0$ designates the reference level of voltage signal output from the receiver 20 (corresponding to the dark current of the device); $V_1$ is the voltage threshold at which the signal width is measured; $t_0$ is the time at which the emitter 12 is initiated to give a light pulse, by the signal generator 10; $t_1$ is the time elapsed between the emitter 12 initiation $t_0$ and a signal S1 reaching the threshold level $V_1$; $t_2$ is the time elapsed between the emitter 12 initiation $t_0$ and the signal S1 falling back below the threshold level $V_1$.

Figure 8A:
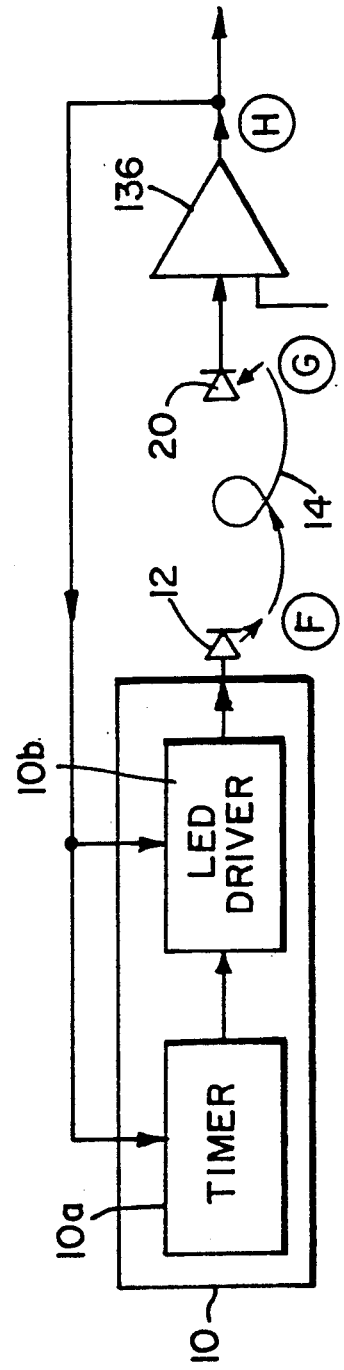
FIG. 8a shows a fourth embodiment of the invention.
Figure 8B:
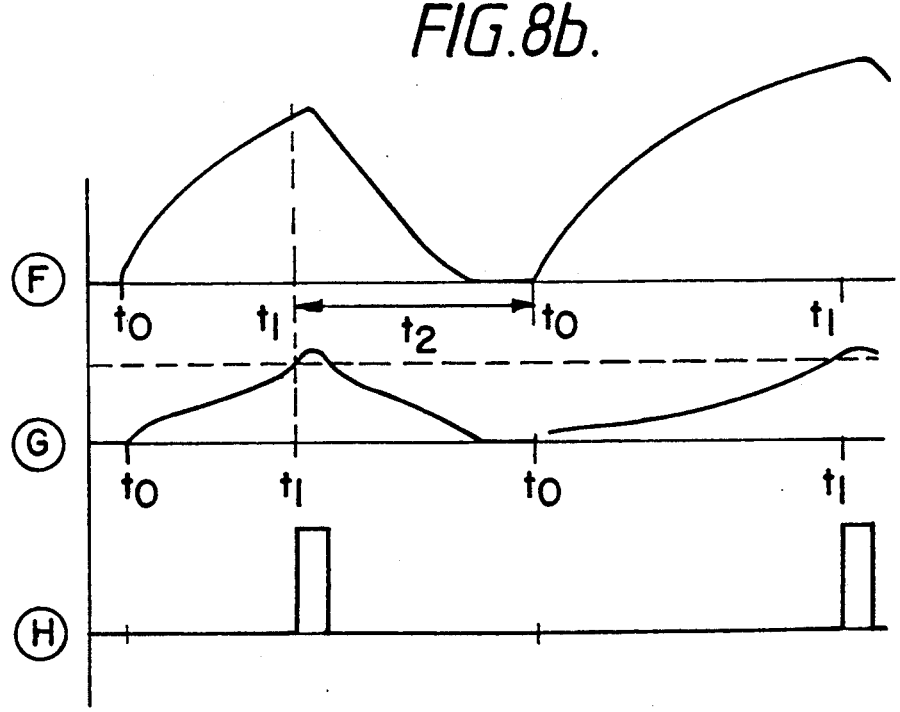
Figure 10:
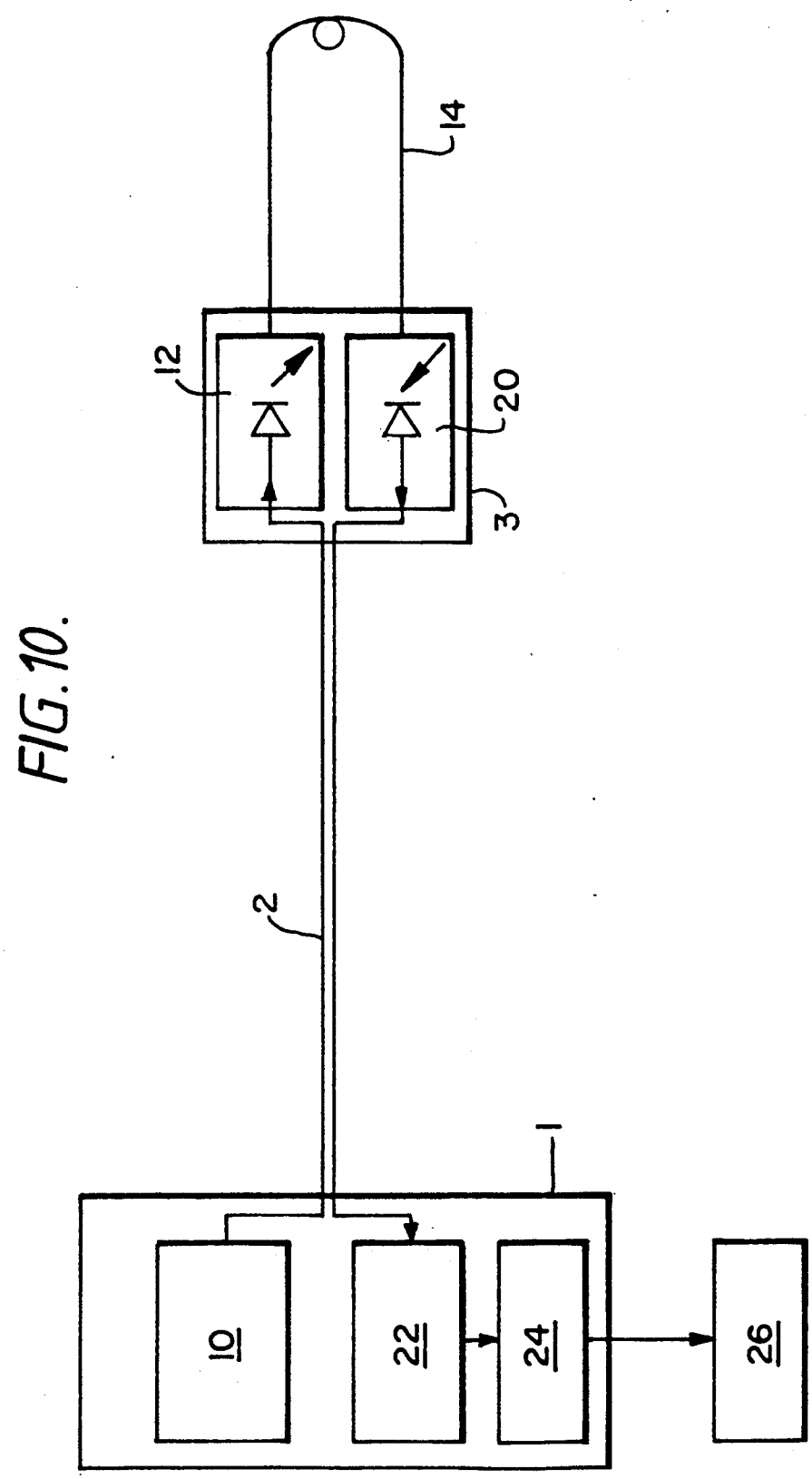
FIG. 10 shows the arrangement of the known fibre-optic sensor controlled system.

Referring to FIGS. 8a and 8b in a fourth embodiment of the invention, the output of the receiver 20 is employed to vary the pulses produced at the emitter 12 so as to maintain the width of the pulses generated by the receiver substantially constant during normal conditions. Particularly, the system keeps the width of the optical pulses produced by the emitter 12 just sufficient to that under normal conditions the receiver 20 produces an output, so that the sensitivity of the device is maximum.

In FIG. 8a, the received signal from receiver 20 is compared, by a comparator 136, with a threshold level $V_1$. When the signal reaches the level of the threshold $V_1$ at time $t_1$, the output H of the comparator 136 goes high. The signal generator 10 comprises a timer circuit 10a and a driver circuit 10b which supplies a signal of suitable voltage to the emitter 12 under the control of the timer 10a. The emitter 12 is selected to be an LED or like device. The emitter circuitry is arranged so that the emitter output will take a finite rise time to rise to a level transmitting sufficient light through the fibre to cause the receiver to generate an electrical signal having a level reaching the voltage threshold $V_1$. To achieve this, the driver circuit 10b comprises a current limiting resistor connected between the +5V supply rail and the anode of the LED 12, and, connected between the anode of the LED 12 and the earth rail, an electrolytic capacitor. Connected between the cathode of the LED 12 and earth is an NPN transistor switch, the base of which is switched from the output of the timer 10a. Charge is therefore stored on the capacitor whilst the transistor (and LED 12) is switched off, and the capacitor is discharged through the LED 12 while the transistor is switched on. Depletion of the charge on the capacitor through the LED therefore causes the LED output to decay in a time-dependent fashion, and is the major cause of the non-linear optical pulse shape, although non linearity and finite rise times of the LED 12 itself may also play a part.

By supplying power to the emitter LED 12 for a period which is less than the rise time to full intensity it is possible to limit the light level created by the LED 12. Therefore, by using the received signal as feedback to switch off the LED 12, the width of the received pulse can be maintained constant. To achieve this, the timer 10a switches the driver circuit 10b on to pass the drive voltage signal to the emitter 12. When the corresponding light pulse F has propagated through the fibre 14 and caused the magnitude of the corresponding electrical pulse produced by the receiver 20 to climb to the level $V_1$ (i.e. at time $t_1$), the comparator 136 transmits a signal back which switches the driver 10b off (e.g. by switching off the transistor). The pulse F at the receiver therefore begins to decay as shown in FIG. 8b. The output H of the comparator 136 also switches on the time 10a, which, after its predetermined time Interval $t_2$, once more switches on the LED driver 10b.

If the initial level of the optical pulses F through the fibre 14 is sufficient to produce at the receiver 20 an electrical pulse G which would substantially exceed the threshold $V_1$, the effect of the apparatus of FIG. 8a is rapidly to reduce the level and width of the pulse so that it only just clears the threshold $V_1$. In principle the pulse would merely touch the threshold $V_1$, and have a zero width, but because the electrical and optical signals take a real amount of time to pass through the system the pulses somewhat exceeded the threshold level $V_1$ and have a finite width. The output H of the circuit of FIG. 8a is thus a sequence of pulses of short duration produced by the comparator 136. Typically, the pulse repetition rate is around 2000Hz and the pulse width is between 2 to 60 micro seconds. The LED rise time may be around 20–60 micro seconds.

When the transmission properties of the fibre are reduced (for example by micro-bending) to a point where, even when the optical pulses F are at the maximum level produceable by the emitter 12, the signal amplitude produced by the receiver 20 falls below the threshold $V_1$, the train of pulses from the comparator 136 ceases, giving rise to an alarm condition. After generating an alarm, the system will therefore require to be externally reset by applying relatively long pulses from the emitter 12.

Various alternative detection or measurement criteria could be employed in this circuit. Firstly, a timing circuit could be provided to time some portion of the pulse signal from either the receiver or the transmitter. For example, the time between the comparator output pulses H could be measured. Since this is equal to $t_2$ (which is fixed) plus $t_1$ (the rise time of the emitter 12, which is connected to depend upon the attenuation of the fibre) it gives a measure which is sensitive to external conditions influencing the fibre attenuation. Alternatively, at the emitter, the rise time $t_1$ could be measured directly by a timer. Alternatively, the maximum amplitude reached by the emitter pulses could be measured, but it is preferred to measure times as this can be made more accurate and robust. All these parameters are, it will be noted, related to the pulse width of the signal at some point.

A further advantage of this embodiment of the invention is that it can be made essentially self-calibrating, regardless of initial values, or types of, emitter 12, fibre 14, or detector 20, provided that the rise times or responses of the components are suitable.

To achieve this, a measurement corresponding to the normal fibre attenuation is taken (for example, the time between adjacent comparator output pulses, $t_2 + t_1$), and subsequently used as the reference time against which subsequent pulse spacings are compared. When a subsequent pulse spacing substantially exceeds the reference pulse spacing, a fault condition is indicated.

Referring to FIG. 9, a fifth embodiment of the invention will be disclosed. As with the embodiment of FIG. 8a, the width of the transmitted pulse is set to the minimum length required to receive a signal from the detector 20.

The generator circuit 10 comprises a driver circuit 10b, as discussed above, controlled by a pulse width generator circuit 10c comprising a timer which enables the LED driver 10b for a predetermined pulse width period. This period is controlled by a pulse width control circuit 10d (for example, a digitally switched resistor network). The pulse width generator 10c is periodically triggered to generate a pulse by a frequency generator 10e operating at a fixed frequency. The width of the pulses produced from the pulse width generator 10c provides an indication of the attenuation of the fibre 14, and hence, if a micro-bend transducer is attached, of the external force supplied. A separate timer 140 is provided to measure the pulse width, which, as stated above, gives an indication of the attenuation of the fibre and hence of any external condition influencing that attenuation. As before, the pulse width signal may be converted by a ROM or some other conversion circuit to provide a readout calibrated in terms of such an external condition (e.g. force), and displayed.

As previously described with reference to FIGS. 8a and 8b, the signal from the output of the comparator 136 is employed to control the width of pulses from the emitter 12. When the level of the electrical signal output of the detector 20 exceeds the threshold $V_1$, the comparator 136 produces an output pulse which triggers a re-triggerable timer 142. The time constant of the re-triggerable timer 142 is longer than that of the frequency generator 10e, so that having been triggered, its output remains low for in excess of the pulse interval and will effect not only the width of the next pulse but also the pulse after that. This provides some smoothing of the operation of the system over time. If the re-triggerable timer 142 is triggered, its output pulse causes the pulse width control 10d to decrease the time constant of the pulse width generator 10c, so as to reduce the pulse width. This continues with each pulse until the width of the pulses generated by the emitter 12 is sufficiently short that the level does not rise above the threshold $V_0$ of the comparator 136.

At this point, the re-triggerable timer 142 is therefore not triggered, and the absence of the pulse output of the timer 142 causes the pulse width control 10d to increase the pulse width of the pulse width generator 10c. The width is increased with each successive pulse until the width of the pulses produced by the emitter 12 is sufficient that their level exceeds the threshold of the comparator 136. Thus, the system will continually adjust the length of the transmitted pulse to lie just above or just below the minimum level required to maintain the trigger threshold of the re-triggerable timer 142, until the limits of the emitter 12 or receiver 20 are reached.

An alarm condition may be derived either from the pulse train output of the comparator 136, when the emitter reaches its limit, or from the width of pulses generated by the pulse width generator measured by the timer 140, or from any other suitable signal related to the emitter pulse width.

The behaviour of the system of FIG. 9 is therefore to reduce the width (and, incidentally, amplitude) of pulses emitted by the emitter 12, until the point where they are only just detectable at the threshold level of the comparator 136.

Two particular applications of the invention are in car windows and in pressure transducing.

In a car window system, the invention is used to detect a stop condition caused either by the window being fully wound or unwound, or hitting an obstacle such as a hand. The micro-bending region 16, 18 is suitably arranged to lie at the periphery of the car window. The application of the invention has several advantages. Firstly, because car electrical systems are a major source of radio frequency and electro-magnetic interference, the stability and inherent insensitivity of the invention to such types of noise is a major advantage. The sensitivity of the micro-bending transducer is a second advantage. The self calibrating aspect of the fourth and fifth embodiments of the invention provide a third advantage. The relative ease of time measurement, compared the accurate electrical parameter measurement (voltage or current) enables the use of simple yet robust circuitry.

A second application of the invention is in pressure transducers, in which the microbending of the fibre is caused by changes of dimension of a pressure vessel to which the fibre is attached. The above advantages apply equally here, and the additional advantage offered by the fourth and fifth embodiments is that the system manipulates the optical pulses so that it is permanently sensitive to small changes in applied pressure.

Various modifications and substitutions in the above described embodiments may be made. Firstly, the embodiments of FIGS. 8a and 9 may include the "noise filtering" circuitry shown in FIG. 2, by employing a first timer 28 set to a period in excess of that of a noise spike preceding the measuring timer 140, as discussed above in relation to FIG. 6. Secondly, the embodiments of FIGS. 6, 8a and 9 may be made fail-to-safe by employing a twin branch circuit as discussed above in relation to FIG. 4. Thirdly, the various discrete digital timers and so forth may be replaced by programmable devices such as microprocessors operating under stored program control. Fourthly, instead of a microbending transducers, other types of transducer which effect the optical properties of the fibre 14 in a way which is capable of being transduced by a receiver may be employed. Similarly, other applications of such devices are possible, such as application to strain gauges, digital scales for weighing produce, accelerometers and so forth. Other modifications and substitutions will be apparent to the skilled reader.

We claim:

1. A fibre optic sensor control system, comprising:
   means for generating a pulsed source electrical signal;
   electro-optical converter means for converting the source electrical signal into an optical signal;
   optical fibre means for transmitting the optical signal with a variable transmittance;
   opto-electrical converter means for converting an optical signal received from the fibre into an electrical signal; and
   detector means for detecting the pulse width of the received electrical signal.

2. A system as claimed in claim 1, wherein the detector means is operable to detect a time-related parameter of the received electrical signal.

3. A system as claimed in claim 1, wherein the source electrical signal is a substantially rectangular wave pulsed signal.

4. A system as claimed in claim 1, further comprising means causing microbending of the optical fibre in response to an applied external force.

5. A signal detector system comprising:
opto-electrical convertor means for converting a pulsed optical signal received from an optical fibre into an electrical signal; and
detector means for detecting the pulse width of the electrical signal.

6. A system as claimed in claim 1 or 3 or 4, wherein the detector means comprises a timer which is triggered by the received electrical signal.

7. A system according to claim 6 further comprising a logic element which is triggered by a combination of the received electrical signal and timing-out of the timer.

8. A system as claimed in claim 6 wherein the timer is arranged to time-out after a predetermined period which is less than the expected pulse-width of the received electrical signal.

9. A system as claimed in claim 7, wherein the logic element comprises a further timer which is disabled by an output from the first-mentioned timer and which is triggered by the received electrical signal.

10. A system as claimed in claim 9, wherein the further timer is triggered by an attenuated form of the received electrical signal.

11. A fibre-optic sensor system comprising:
means for generating a pulsed optical signal,
optical fibre means for receiving the optical signal,
means for varying an optical property of the fibre in dependance upon an external condition,
signal detector means including timing means for timing the duration of a predetermined portion of the pulses of the signal, and
means for indicating the value of the external condition in dependence upon the timed signal portion.

12. A system according to claim 11 in which the pulsed optical signal is controlled in dependence upon an electrical signal corresponding to an optical signal transmitted through said optical fibre means.

13. A system as claimed in claim 11 and including a further such detector means for detecting the optical signal, and means for comparing the outputs of the two detector means and for determining whether the outputs of the two detector means are consistent with each other.

14. A fibre-optic sensor control system comprising:
pulsed optical source means for producing optical pulses,
optical fibre means for receiving optical pulses form the source means, and
detector means for detecting pulses received via the fibre means and for generating a corresponding pulsed electrical signal to control the optical source so as to maintain the pulse width of the pulsed electrical signal substantially constant.

15. A system according to claim 14 comprising means for indicating the value of an external condition affecting the optical properties of the fibre means, in response to variations in the optical pulses generated by the source means.

16. A system according to claim 15 in which the indicating means is responsive to the source pulse width.

17. A system according to claim 15 in which the indicating means is responsive to the source rise time.

18. A system as claimed in claim 14 and including a further such detector means for detecting the optical pulses, and means for comparing the outputs of the two detector means and for determining whether the outputs of the two detector means are consistent with each other.

19. A detector system for a fail-to-safe control system comprising:
opto-electrical converter means for converting a pulsed optical signal received from an optical fibre into an electrical signal, and
detector means for detecting the pulse width of the electrical signal, the detector means being operable not to respond to an electrical pulse having less than a predetermined pulse width.

20. A system as claimed in claim 1 or 5 or 19 and including a further such detector means for detecting the received electrical signal, and means for comparing the outputs of the two detector means and for determining whether the outputs of the two detector means are consistent with each other.

21. A system as claimed in claim 19 and including a further such detector means for detecting the received electrical signal, and means for comparing the outputs of the two detector means and for determining whether the outputs of the two detector means are consistent with each other, and wherein the logic element comprises a further timer which is disabled by an output from the first-mentioned timer and which is triggered by the electrical signal, wherein each further timer has an output and a complementary output, the comparing means comprising a transistor bridge having transistors with control electrodes, with the control electrodes of the transistors connected to the outputs and complementary outputs of the timers, and the bridge providing outputs to a latch device.

22. A method of detecting an abnormal condition, comprising the steps of:
providing an optical fibre arranged to be subjected to pressure by said abnormal condition, said optical fibre having first and second ends;
launching a pulsed optical signal into said first end of said optical fibre;
detecting a corresponding pulsed optical signal from said second end of said optical fibre, to provide a signal having a pulse width which varies according to pressure on said fibre; and
generating an indication of said abnormal condition when said pulse width is less than a predetermined value.

23. A method of measuring pressure, comprising the steps of:
providing an optical fibre having first and second ends and mounted so as to be subjected to pressure;
launching a pulsed optical signal into said first end;
detecting a corresponding pulsed optical signal at said second end and providing a corresponding signal having a pulse width which varies according to pressure on said fibre; and
controlling the pulse width of said launched optical signal in dependence upon said detected optical signal so as to retain said detected pulse width substantially constant.

24. In an optical fibre sensing method comprising the steps of launching a pulsed optical signal into said optical fibre at a first end thereof and detecting a corresponding signal at a second end thereof, the steps of timing the duration of received signals, and of rejecting received pulses of shorter than a predetermined duration.

* * * * *

UNITED STATES PATENT AND TRADEMARK OFFICE
CERTIFICATE OF CORRECTION

PATENT NO.   : 5,138,152
DATED        : August 11, 1992
INVENTOR(S)  : Colin Botting It is certified that error appears in the above-identified patent and that said Letters Patent is hereby corrected as shown below:

Column 13, line 2, after "means" insert --for--

Column 13, line 51, change "form" to --from--

Signed and Sealed this

Ninth Day of November, 1993

Attest:

BRUCE LEHMAN

*Attesting Officer*     *Commissioner of Patents and Trademarks*